United States Patent Office 3,720,528
Patented Mar. 13, 1973

3,720,528
CEMENT HAVING IMPROVED COLOR
Russell T. Jordan, Denver, Colo.
(180 S. Xenia St., Enon, Ohio 45323)
No Drawing. Continuation-in-part of application Ser. No. 576,816, Sept. 2, 1966. This application May 18, 1970, Ser. No. 38,546
Int. Cl. C04l 7/02
U.S. Cl. 106—90
15 Claims

ABSTRACT OF THE DISCLOSURE

Colored cements having improved color and reduced efflorescence are prepared by adhering to a portion of the surface of a majority of the unset cement particles a surface-tension reducing agent and/or a dispersant which effects dispersion by establishing a common charge on each of the cement particles without substantial reduction in the size of the particles. Preferably, the organic matter is adhered to the cement particles by impinging a stream of one of the particles on a stream of the other and preferably both a surface-tension reducing agent and a dispersant are utilized.

CROSS REFERENCES

This application is a continuation-in-part of U.S. application Ser. No. 576,816 filed Sept. 2, 1966 now abandoned and is a companion case to my co-pending U.S. application Ser. No. 38,603, filed May 18, 1970 and titled "Improved Cements."

BACKGROUND OF THE INVENTION

This invention relates to cements. More particularly, it relates to the preparation of improved color cements.

The most probable area for the discovery of United States patents relating to the subject matter of this invention is found in Class 106. Subclasses 90 and 95 are probably the most pertinent subclasses.

Colored cements are generally prepared by mixing coloring agents with cement and thereafter handling the cement as though no color was contained herein. However, color has been introduced into cement while suspended in water or absorbed on a carrier which is mixed with the dry cement. (See U.S. Pats. Re. 20,776; 1,453,- 457; 1,829,082; and 1,824,854.) The literature in this area attests to the continuing effort by the cement industry to evolve colored cements of good strength, low efflorescence and low cost.

I am aware that dispersants have been dissolved in makeup water and the solution mixed with pigment and cement (U.S. Pats. 1,972,207 and 1,972,208). However, colored cements which are improvements on these prior cements are prepared by the process of this invention. It is postulated that too many cement and/or pigment particles are totally or almost totally coated by the prior processes. Other patents of interest with respect to this invention include U.S. Pats. 2,141,569; 2,305,113; 2,927,- 862; 2,934,445; 3,097,955; and 2,003,656. These patents describe the use of organic additives to reduce plasticity, improve workability, etc.

SUMMARY OF THE INVENTION

I have now discovered that the color of cement per unit of coloring agent can be enhanced, the tendency of the colored cement to effloresce can be substantially reduced, and the strength of the colored set cement often increased by partially coating the pigment particles and/ or cement particles with at least one additive and coadditive in the preferred embodiment, which is substantially water insoluble in the set cement. This result can be accomplished by (a) coating the coloring agent with additive agent prior to coating the ground, unset cement with the coated pigment; (b) coating the unset cement particles with additive agent, and thereafter coating the additive agent-cement mixture with coloring agent; (c) independently coating both the coloring agent and ground, unset cement with additive agent and later mixing these coated materials prior to use; or (d) simultaneously coating the coloring agent and ground, unset cement with additive agent in a unitary operation. In the last case, the coloring agent and cement particles can be pre-coated or can be simultaneously coated with the additive agent. The coated cement particles are then mixed with water and allowed to remain quiescent until the mixture forms a unitary mass of set cement.

"Additive agent" is used herein to include either or both of "additive" and "coadditive." "Additive" is a surface-active agent which primarily acts to reduce surface tension between the cement particles and water. "Coadditive" is a surface-active agent which primarily imparts a common charge to each of the particles. Coadditives are commonly called "dispersants" in a number of industries. The use of additive is much preferred where only one species of additive agent is used.

The term "coating" as used herein, is the adhering of additive agent to the ground, unset particles of cement or coloring agent particles so as to partially cover a substantial percentage of the particles being coated. Minor portions of these particles can be completely coated or can remain uncoated.

The additive agent can be solid or fluid. Preferably, at least one of the particles of cement, additive agent, and coloring agent is impinged on another. While coating of the additive agent on other particles is preferably done in impinging streams, other mechanisms can be utilized in the coating operation. Particle contact of the type which would cause substantial grinding, i.e., size reduction, of the cement particles is not required. Poor results are apparently obtained where the particle contact is carried out under such conditions because the cement particles coat the additive agent and/or the coloring agent.

Merely uniformly dispersing the coloring agent and solid additive agent particles among the cement particles without the required coating, i.e., adherence, taking place results in little improvement in the effectiveness of the coloring agent, the reduction of efflorescence, or improvement increment strength. This type mixing may occur with drum-type mixers, planetary-type vertical mixers, and paddle mixers because good results (when compared to the result obtained with grinding) are difficult to obtain with these types of mixers even with the expenditure of relatively great amounts of time for mixing.

The percentage of cement particles coated in the process of this invention varies. Generally, increasingly improved results, for a given amount of coloring agent, are obtained with increasing percentages of cement particles coated. Almost complete color enhancement is obtained when 80–90% of the cement particles are at least about 65–75% coated with additive agent and only on the order of about 15%, by weight, of this amount is totally coated. The relationship between the amount of a particular additive agent needed and color enhancement can readily be determined by relating visual estimates of the coating as seen under a microscope, to the amount of color enhancement effected.

As only 1 to 2% additive agent, by weight, is sufficient to produce maximum color enhancement, it is obvious that the coating of the cement and/or the pigment by additive agent must be substantially uniform through a batch of cement, though the surface coated on an individual particle can range from no coating to total coating within the batch.

A major portion of the cement particles are coated to provide the improved cements of this invention. Preferably, at least about 60% and more preferably about 75% of the particles are coated. Almost total color enhancement is obtained at 85–90% coated particles. Preferably, no more than about 15 to 25% of the particles is ever totally or almost totally covered. As much as 60–65% total coating of the particles can be tolerated for some uses, however.

It is preferred that the additive agent be solid in the form of small (0.01 to 10 micron) particles though fluid additive agent, preferably in droplet form, can be used in the process of this invention. Even slurries of additive agent in water or concentrated solutions of additive in water can be used. The resulting coated particles should be substantially dry, and free-flowing, unless immediate use is contemplated. Any water used should not wet the coloring agent and cement particles to the extent that additive coats entirely a major amount of the coloring agent or cement. Preferably, no more than about 3 to 5%, by weight of solids, water need be used and preferably about 1 to 2% is used where the coated, colored cement is to be stored. Greater amounts can be used where makeup water is to be added immediately and the cement allowed to set.

While the use of only 1 to 2% total additive agent is preferred, I can use from about 0.5 to about 3% or more additive agent with good results. However, it should be noted that, at higher additive agent concentrations, there is a tendency for the organic matter in the coating to weaken the cement. Possibly too many particles are totally covered. Alternatively, excess organic matter may prevent particle to particle contact. The use of additive agent in amounts prescribed in the preferred range, as indicated previously, usually causes an increase in cement strength rather than a reduction thereof.

A variety of additive agents can be used in preparing the improved cements of this invention. The additive agent can be water soluble, soluble in water only when present with a cosolvent, or dispersible in water in micellar form. Preferably, the additive agent does not substantially alter the pH of the setting cement from that pH which the setting cement would optimally have in the absence of the additive. Buffering agents can be added to aid in pH control. Bactericides, fungicides, antioxidants, etc., can also be added where necessary.

While only one additive agent will provide an improved color effect, the use of a plurality of species is preferred. Generally, there is no appreciable color enhancement on addition of more than about 4 to 5% pigment to the cement where a plurality of additive agents, for example, a sulfonic acid-formaldehyde condensation product and sodium stearate, are used.

The additives useful in reducing surface tension are organic and have both polar and nonpolar units in the molecule. Preferably, these additives are soluble in water or form micelles therein. The most preferred additives are the alkali metal-fully saturated fatty acid soaps having 12 to 22 carbon atoms. The most preferred surface active organic additives are sodium stearate and stearic acid.

Coadditives are the usual particle dispersants of industry which impart a common electrical charge to the particles being dispersed. The best combinations of additive and coadditive are readily determined by routine testing. Most preferred coadditives are the sulfonate-formaldehyde condensation products.

Operative types of additives and coadditives include the water-soluble alkylaryl sulfonates, the alkali and alkaline earth metal soaps, the water-insoluble fatty acid soaps, various sulfonic acids-aldehyde condensation products, copolymers of various organic acids and ethers, etc. Additives not normally considered surfactants include polybasic acids, etc. Surfactant additives should have at least 8, and preferably at least 12, carbon atoms in an alkane portion of the molecule.

Polybasic acids can contain as few as 2 to 3 carbon atoms but preferably contain at least 6 carbon atoms. Here, again, the use of a plurality of additive species provides an enhanced effect. For example, adipic acid produces a reduction in efflorescence but the effect is increased appreciably through the use of an equal amount of a mixture of adipic and malonic acids.

As previously indicated, additive agent is readily coated on the neat cement while dispersed in small amounts of water. Thus, droplets of 1 gm. of liquid (Tamol 721 suspended in 100 g. $H_2O$) are sprayed into dry neat cement to form a dry cement powder having free-flowing properties capable, when mixed with makeup water, of forming a cement exhibiting substantially no efflorescence. Mixing, in this instance, is preferably accomplished in a mixer where the two streams of particles are centrifugally forced into fine streams which impinge to cause coating.

Cements with which this invention are useful are termed portland-type cements and include the usual commercial cements used to make up mortar, hydraulic cement, etc. These include the following types: uncolored gray or white portland cement, pozzolanic cements, supersulfate cements, and high alumina cements. Preferably, this invention is practiced with normal portland cement.

The coloring agents used in the process of this invention include the usual inorganic pigments, such as chrome oxides and iron oxides as well as organic dyes and hybrid pigments having organic and inorganic moities.

The Flash Mixer, manufactured by J. H. Day Company of Cincinnati, Ohio, is preferred for adhering additive agent to the cement and/or coloring agent. The Flash Mixer utilizes two horizontal discs rotating in opposite directions at 3600 r.p.m. to propel streams of particles against one another. Materials to be mixed are introduced into the top of the unit and fall onto the counter rotating discs which impart a rotational component to the movement of the particles to impinge one particle stream on another before the mixed coated material passes downwardly through an exit chute for bagging or bulk storage.

The mixer is, with slight modification, also quite useful for grinding particles of, for example, pigments or cement. Three tons of improved cement can be readily coated per hour by all Models C, CD and CS (18–350) Flash Mixer or Centri Flo Mixers.

The above generally teaches the invention. This teaching is amplified by the following specific examples which are not intended to be limiting in any way.

EXAMPLE I

Aliquots of white, gray and pozzolanic cements are mixed with 3%, by weight, iron oxide pigment in the absence of an additive. Additional aliquots and these cements are mixed with a mixture of, by weight of the cement, 3% pigment and 2%, by weight of the cement-pigment mixture, of equal parts of stearic acid and Tamol SN. Coating of 375 gm. of the various mixtures is accomplished in a Tyler Portable Sieve Shaker in a 9½" diameter by 2" deep pan containing steel "balls" of various sizes and shapes.

Samples of the coated and uncoated mixtures are periodically removed and compared, by color reflectance meter. Maximum color development occurs in about 15 minutes.

Prior to hydration and setting, the cement containing additive shows, under the microscope, pigment particles uniformly dispersed in random fashion on the surface of and in fissures in the cement particles. Little or no particles are found in the interstitial spaces between cement particles. Further, the cement and pigment do not segregate on handling during bagging, shipment etc.

Cement and pigment mixtures containing no additive show nonuniform pigmentation, deposit of some pigment in the interstitial spaces, severe efflorescence in the set cement, and segregation in the unset cement.

The X-ray patterns and UV patterns for the optimally-coated cement with and without additives also differ.

EXAMPLE II

To test the effect of mixing and coating on the pigment-additive cement mixtures, portland cement is mixed with 1% stearic acid and 1% Tamol SN and amounts and types of pigments indicated in Table 1. Color development is then compared with neat raw pigment as a standard. Table 1 sets out the differences incident to coating in a mixer where the two streams of particles are centrifugally forced into fine streams which impinge to cause adhering at a rate of 100 lbs. of coated mixture in one minute and in a paddle mixer (Hobart Model H–50 manufactured by The Hobart Manufacturing Co. of Troy, Ohio) wherein 10 lbs. of mix was stirred for five minutes. The table sets out the effectiveness of the processes as a percent of color development, the standard being 100%.

TABLE 1

| Color | Pigment-cement ratio | Color development as percent of standard | |
|---|---|---|---|
| | | Impingement | Paddle mixer |
| Red ($Fe_2O_3$) | 3:97 | 45 | 15 |
| | 5:95 | 51 | 18 |
| | 7:93 | 52 | 23 |
| | 10:90 | 52 | 30 |
| Green (Chrome green) | 3:97 | 54 | 18 |
| | 5:95 | 60 | 22 |
| | 7:93 | 68 | 29 |
| | 10:90 | 68 | 34 |
| Yellow ($Fe_2O_3$) | 3:97 | 38 | 9 |
| | 5:95 | 44 | 15 |
| | 7:93 | 46 | 17 |
| | 10:90 | 51 | 20 |

EXAMPLE II

Table 2 shows the amount of pigment required for comparable tinting where coating is accomplished by impingement on the one hand and mixing by paddle mixing on the other, where both mixtures contain 1% Tamol SN and 1% stearic acid. There is little color enhancement above 4 or 5%, by weight of cement, pigment where coating is by impingement. Color is measured using the Lovibond Tintometer, Photovolt Reflection Meter and visual comparison (Munsell Book of Color). The methods of ASTM D 307–44 and Fed. Spec. TT–P–141G Method 425.1 are used in the comparative status.

TABLE 2

| Color | | | | | | | |
|---|---|---|---|---|---|---|---|
| Blue | | Green | | Yellow | | Red | |
| Impingement | Paddle | Impingement | Paddle | Impingement | Paddle | Impingement | Paddle |
| 1 | 2.5 | 1 | 3 | 1 | 3 | 1 | 4.5 |
| 2 | 4 | 2 | 5.5 | 2 | 6 | 2 | 6 |
| 3 | 6 | 3 | 8 | 3 | 8 | 3 | 9 |
| 4 | 10 | 4 | 10 | 4 | 10+ | 4 | 12 |

Table 3 sets out the percentage increase in efflorescence inhibition occurring when the listed additives are used alone and in combination in portland cement with pigment. The standard for comparison is ASTM efflorescing cement. 1% by weight of additive was added in each case.

Efflorescence is measured by mixing a test mortar in accordance with ASTM–C 12 Subcommittee 11, Experimental Procedure for Pilot Study for the Efflorescence Test Procedure. The mortar mix contains 1080 gm. of 230 grade sand, 1080 gm. graded Ottawa sand and 630 gm. cement containing regulated amounts of additive. Minimum water is added to achieve plasticity. The mixed mortar is placed between the ends of test bricks with a one-half inch excess at the joint. After curing for three days, the cemented bricks are placed in a shallow pan of water. Efflorescing material migrates onto the brick during the 14 day soaking in one inch of water. The test sample is compared against standard photographs at the end of the test.

TABLE 3

| Additive | Adipic | Arachidic | Glutaric | Oleic | Palmitic | Stearic | Undecylenic |
|---|---|---|---|---|---|---|---|
| Adipic | | 7 | | 74 | 78 | | 95 |
| Arachidic | | | 3 | | | 36 | 85 |
| Glutaric | | | | 5 | | | |
| Oleic | | | | | 48 | | 96 |
| Palmitic | | | | | | 6 | 92 |
| Stearic | | | | | | | 65 |
| Undecylenic | | | | | | | 1 |

EXAMPLE IV

A cement of comparable whiteness to "white" cement is prepared by mixing 4%, by weight of the cement, rutile and 1% each of stearic acid and Tamol 721 diluted with 1%, by weight, Tamol active solids at 6,000 lbs. per hour in a Flash Mixer. The Tamols are alkali metal salts of condensation products of formaldehyde and organic acids sold by Rhom and Haas Co.

EXAMPLE V

A series of replicate experiments was carried out to compare the effect of "adhering" additive agent to cement and pigment particles with the processes of the prior art in which particle size was reduced appreciably in the presence of additives, mixing the additive and coadditive in the makeup water used to make cement, and the mixing of additive agent, pigment and cement by paddle mixing with little or no "adherence."

Four series of experiments were run to determine the color development of the various processes mentioned when 3% of the indicated pigments were added to the cement. ASTM D 307–44 and Fed. Spec. TT–P 141G Method 425.1 were the testing methods used in the described series of experiments. Each series was composed of three replicate experiments.

In the first series of experiments, shown in Table I, "adherence" was accomplished in a Tyler Portable Sieve Shaker in a 9.5" diameter by 2" deep pan containing steel "balls" of various sizes and shapes. (See Example I.)

In the second series of experiments, a ball mill was used to grind the mixture of particles and additive agent to a smaller size. The data of Table II shows that the color development was substantially reduced utilizing this process.

In the third series of experiments, shown in Table III, a Hobart mixer (Model H–50) was used to mix the ingredients. (See Example II.) Again, there was a substantial reduction in color development.

In the fourth series of experiments, the additive and coadditive were added to the makeup water. Table IV shows an even greater difference in color development.

Data in the tables is an average of three replicate experiments. All percentages are by weight. Color intensity of the final cement was measured using a Lovibond Tintometer, Photovolt Reflection Meter and visually using the Munsell Book of Color. The data in the tables is Photovolt Reflection Meter data and the other measuring methods give approximately the same results. Type one portland cement was used in all experiments.

TABLE I

| | Cement in grams | Pigment, percent | Tamol SN, percent | Na stearate, percent | Shaker time, minutes | Water, cc. | Color development results as percent of standard— | | |
|---|---|---|---|---|---|---|---|---|---|
| | | | | | | | Red | Green | Yellow |
| A | 495 | 3 | 1 | 1 | 15 | 22 | 55 | 46 | 44 |
| B | 495 | 3 | 2 | 0 | 15 | 22 | 48 | 38 | 32 |
| C | 495 | 3 | 0 | 2 | 15 | 22 | 30 | 29 | 19 |
| D | 497 | 3 | 0 | 0 | 15 | 22 | 16 | 10 | 6 |

TABLE II

| | Cement in grams | Pigment, percent | Tamol SN, percent | Na stearate, percent | Grinding time, hours | Water, cc. | Color development results as percent of standard— | | |
|---|---|---|---|---|---|---|---|---|---|
| | | | | | | | Red | Green | Yellow |
| A | 495 | 3 | 1 | 1 | 5 | 22 | 20 | 19 | 12 |
| B | 495 | 3 | 2 | 0 | 5 | 22 | 14 | 11 | 9 |
| C | 495 | 3 | 0 | 2 | 5 | 22 | 10 | 7 | 5 |
| D | 497 | 3 | 0 | 0 | 5 | 22 | 8 | 5 | 3 |

TABLE III

| | Cement in grams | Pigment, percent | Tamol SN, percent | Na stearate, percent | Paddle time, minutes | Water, cc. | Color development results as percent of standard— | | |
|---|---|---|---|---|---|---|---|---|---|
| | | | | | | | Red | Green | Yellow |
| A | 495 | 3 | 1 | 1 | 15 | 22 | 15 | 18 | 10 |
| B | 495 | 3 | 2 | 0 | 15 | 22 | 9 | 12 | 7 |
| C | 495 | 3 | 0 | 2 | 15 | 22 | 6 | 6 | 4 |
| D | 497 | 3 | 0 | 0 | 15 | 22 | 5 | 5 | 3 |

TABLE IV

| | Cement in grams | Pigment, percent | Tamol SN, percent | Na stearate, percent | Water, cc. | Color development results as percent of standard— | | |
|---|---|---|---|---|---|---|---|---|
| | | | | | | Red | Green | Yellow |
| A | 495 | 3 | 1 | 1 | 22 | 10 | 11 | 9 |
| B | 495 | 3 | 2 | 0 | 22 | 7 | 9 | 6 |
| C | 495 | 3 | 0 | 2 | 22 | 5 | 5 | 4 |
| D | 497 | 3 | 0 | 0 | 22 | 5 | 5 | 8 |

In all experiments, the data denoted by "A" involved the applicant's preferred process utilizing both additive and coadditive; the data denoted by "B" and "C" involved the use of only one additive or coadditive; and the data denoted by "D" involved the use of no additive agent and is a control. In each instance, the results obtained by "adhering" the additives to the particles without substantial grinding was strikingly better than when the additives were added to the makeup water, ground, or merely mixed with the particles.

EXAMPLE VI

A cement of comparable whiteness to "white" cement is prepared by mixing 4%, by weight of the cement, rutile and 1% each of oleic acid and Gantrez AN diluted with 1%, by weight, "active solids" at 6,000 lbs. per hour in a Flash Mixer. Gantrez copolymers are of maleic anhydride and methyl vinyl ethers and are manufactured by the General Aniline Film Corp.

What is claimed is:

1. The process of forming a substantially dry, uniformly colored, unset cement having coloring agent particles substantially uniformly dispersed on the surface and in the fissures of the cement particles comprising forcibly contacting substantially dry, free flowing particles from the group consisting of portland type cement particles, coloring agent particles and combinations thereof with sufficient additive from the group consisting of surface tension reducing additive, and common electrical charge imparting coadditive and combinations thereof to adherently coat only a part of the surface of a major portion of the particles and, where both coloring agent and cement particles are not uniformly mixed and contacted with additive, mixing coated with uncoated particles, all without substantial reduction in the size of the cement particles.

2. The process of claim 1 wherein at least one of the cement and color particles are coated by impinging at least one of the additive agent and cement and/or coloring agent particles on the other.

3. The process of claim 1 wherein the additive is stearic acid or sodium stearate.

4. The process of claim 2 wherein the additive is stearic acid or an alkali metal salt thereof and the coadditive is a naphthalene sulfonate-formaldehyde condensation product and the combined weight of the additive agent is about 0.5 to about 3%, by weight, of the cement.

5. The process of claim 2 wherein the additive is stearic acid and the coadditive is a naphthalene sulfonate-aldehyde condensation product.

6. The process of claim 2 wherein the additive is stearic acid or an alkali metal salt thereof and the coadditive is a naphthalene sulfonate-formaldehyde condensation product and the combined weight of the additive agent is about 0.5 to about 3%, by weight, of the cement.

7. The process of claim 2 wherein at least about 75% of the cement particles are partially coated with additive agent and no more than about 15–20% of the particles are totally coated.

8. The process of claim 2 wherein about 85–90% of the cement particles are at least about 65–75% coated with additive agent and only on the order of about 15% of the particles are totally coated with about 1–2%, by weight of the cement, additive agent.

9. The process of claim 2 wherein the additive is an alkali metal soap of a fatty acid containing 12 to 22 carbon atoms or the free acid per se and the coadditive is a naphthalene sulfonate-formaldehyde condensation product.

10. A uniform mixture of unset, substantially dry, free-flowing portland-type cement particles and coloring agent particles having adhered to at least one of the portland-type cement particles and coloring agent particles through forcible contact which caused no substantial reduction in the average size of the contacted particles, additive agent, in amounts sufficient to substantially eliminate efflorescence and increase the apparent color density of each unit of color added to the cement, selected from the group consisting of surface tension reducing of the additive, common electrical charge imparting coadditive and mixtures thereof; said additive agent being present in an amount sufficient to adherently coat only a part of the surface of a major portion of the contacted particles and insufficient to substantially weaken the strength of the cement when set and said coloring agent particles being substantially uniformly dispersed on the surface of and in the fissures of the cement particles with substantially no segregation during handling.

11. The cement of claim 10 prepared by impinging at least one of a stream of at least one of finely divided additive agent and finely ground cement particles and/or coloring agent particles on one another.

12. The cement of claim 11 wherein a major portion of the surface of at least about 60% of the cement or coloring agent particles are partially coated.

13. The cement of claim 10 wherein at least 75% of the cement and/or coloring agent particles are partially coated with additive agent and no more than 15–25% of the particles are totally coated with additive agent.

14. The cement of claim 11 wherein 85–90% of the cement and/or coloring agent particles are at least 65–75% coated with additive agent and only on the order of about 15% of the cement particles are totally coated with about 1–2%, by weight of the cement, additive agent.

15. The cement of claim 13 wherein the additive is stearic acid or an alkali metal salt thereof and the coadditive is a naphthalene sulfonate-formaldehyde condensation product and the combined weight of the additive agent is from about 0.5 to about 3%, by weight, of the cement.

References Cited

UNITED STATES PATENTS

| | | | |
|---|---|---|---|
| 3,331,905 | 7/1967 | Hint | 264—122 |
| 3,097,955 | 7/1963 | Harris | 106—95 |
| 2,927,862 | 3/1960 | Welch | 106—97 |
| 2,934,445 | 4/1960 | Jones et al. | 106—95 |
| 2,305,113 | 12/1942 | Scripture | 106—95 |
| 2,141,569 | 12/1938 | Tucker et al. | 106—90 |
| 1,972,207 | 9/1934 | Tucker et al. | 106—90 |
| 1,453,457 | 5/1923 | Haldeman | 106—97 |
| Re. 20,776 | 7/1938 | Amon | 106—97 |

JAMES E. POER, Primary Examiner

U.S. Cl. X.R.

106—95, 97

UNITED STATES PATENT OFFICE
CERTIFICATE OF CORRECTION

Patent No. 3,720,528        Dated March 13, 1973

Inventor(s) Russell T. Jordan

It is certified that error appears in the above-identified patent and that said Letters Patent are hereby corrected as shown below:

Col. 4, line 14;          "Mixing," should read -- Particle contact, --.

Col. 7, Table IV under    The last figure in line "D" should
Example V:                be "2".

Col. 9, line 10 should read:

"consisting of surface tension reducing additive, ".

Signed and sealed this 28th day of August 1973.

(SEAL)
Attest:

EDWARD M. FLETCHER, JR.            RENE D. TEGTMEYER
Attesting Officer                  Acting Commissioner of Patents